(12) United States Patent
Wu

(10) Patent No.: US 10,671,306 B2
(45) Date of Patent: Jun. 2, 2020

(54) CHUNK-BASED DATA DEDUPLICATION

(71) Applicant: Yingquan Wu, Palo Alto, CA (US)

(72) Inventor: Yingquan Wu, Palo Alto, CA (US)

(*) Notice: Subject to any disclaimer, the term of this patent is extended or adjusted under 35 U.S.C. 154(b) by 8 days.

(21) Appl. No.: 16/198,582

(22) Filed: Nov. 21, 2018

(65) Prior Publication Data

US 2019/0377509 A1    Dec. 12, 2019

Related U.S. Application Data

(60) Provisional application No. 62/681,615, filed on Jun. 6, 2018.

(51) Int. Cl.
*G06F 13/00*  (2006.01)
*G06F 3/06*  (2006.01)
*H04L 9/32*  (2006.01)

(52) U.S. Cl.
CPC .......... *G06F 3/0641* (2013.01); *G06F 3/0608* (2013.01); *G06F 3/0673* (2013.01); *H04L 9/3239* (2013.01)

(58) Field of Classification Search
None
See application file for complete search history.

(56) References Cited

U.S. PATENT DOCUMENTS

| | | |
|---|---|---|
| 4,122,440 A | 10/1978 | Langdon, Jr. et al. |
| 4,652,856 A | 3/1987 | Mohiuddin et al. |
| 8,706,695 B1 * | 4/2014 | Sorenson, III ...... G06F 16/2255 707/649 |
| 9,214,954 B2 | 12/2015 | Ogasawara et al. |
| 9,628,111 B2 | 4/2017 | Henry et al. |
| 2011/0040951 A1 | 2/2011 | Akirav et al. |
| 2011/0145489 A1 * | 6/2011 | Yu .......................... G06F 3/0613 711/103 |
| 2011/0179219 A1 * | 7/2011 | Ma .......................... G06F 3/0613 711/103 |
| 2011/0196869 A1 | 8/2011 | Patterson et al. |
| 2011/0307447 A1 | 12/2011 | Sabaa et al. |
| 2012/0191670 A1 | 7/2012 | Kennedy et al. |
| 2013/0080406 A1 | 3/2013 | LaRiviere et al. |
| 2015/0066876 A1 * | 3/2015 | Li .......................... G06F 3/0641 707/692 |
| 2016/0036719 A1 * | 2/2016 | Alicherry ............ H04L 67/2828 714/15 |

OTHER PUBLICATIONS

Introduction to the EMC XtremIO Storage Array, White paper by Dell EMC Technologies, May 2015. Available: https://www.emc.com/collateral/white-papers/h11752-intro-to-XtremIO-array-wp.pdf.
https://www.purestorage.com/products/purity/flash-reduce.html, Pure Storage Corp.

(Continued)

*Primary Examiner* — Sean D Rossiter
(74) *Attorney, Agent, or Firm* — Nwamu, P.C.

(57) ABSTRACT

A chunk-based data deduplication system and method. Incoming data chunk is partitioned into head and tail portions for fingerprinting and mapping into respective head SHA (secure hash algorithm) and tail SHA tables. Head or tail fingerprints are used to locate predecessor data chunks almost identical to incoming data chunks and to determine data bursts to deduplicate the incoming data chunks.

25 Claims, 6 Drawing Sheets

(56) References Cited

OTHER PUBLICATIONS

Data Deduplication Background: A Technical White Paper, Quantum Corp., 1999. Available: https://iq.quantum.com/exLink.asp?6668121OP41V56I29836713.

L. DuBois and M. Amaldas, "Key considerations as dedupation evolves into primary storage," IDC white paper, May 2010. Available: https://www.netapp.com/us/media/wp-key-considerations-deduplication-evolves-into-primary-storage.pdf.

S. Quinlan and S. Dorward, "Venti: A new approach to archival storage," Proc. USENIX on File and Storage Technologies (FAST), pp. 1-13, Jan. 2002.

B. Zhu, K. Li, and R.H. Patterson, "Avoiding the disk bottleneck in the data domain deduplication file system," Proc. 6th USENIX on File and Storage Technologies (FAST), vol. 8, pp. 1-14, Feb. 2008.

A. Muthitacharoen, B. Chen, and D. Mazieres, "A low-bandwidth network tile system," Proc. Acm Symp. Oper. Syst. Principles, pp. 1-14, Oct. 2001.

P. Shilane, M. Huang, G. Wallace, and W. Hsu, "WAN optimized replication of backup datasets using stream-informed delta compression," Proc. 10th USENIX on File and Storage Technologies (FAST), pp. 49-64, Feb. 2012.

Y. Hua, X. Liu and D. Feng, "Cost-efficient remote backup services for enterprise clouds," IEEE Trans. Industrial Informatics, vol. 12, No. 5, pp. 1650-1657, 2016.

National Institute of Standards and Technology, FIPS 180-4. Secure Hash Standard US Dept. of Commerce, Aug. 2015. Available: https://nvlpubs.nist.gov/nistpubs/FIPS/NIST.FIPS.180-4.pdf.

M.O. Rabin, "Fingerprinting by random polynomials," Cntr. Res. Comput. Tech., Aiken Comput. Lab., 1981.

U. Manber, "Finding similar files in a large tile system," Technical Report TR 93-33, Department of Computer Science, University of Arizona, Oct. 1993, also in Proc. USENIX Winter Technical Conf., pp. 17-21. 1994.

K. Eshghi and H.K. Tang, "A framework for analyzing and improving content-based chunking algorithms," Hewlett Packard Lab., Palo Alto, CA, USA, Tech. Rep. HPL-2005-30(R.1), 2005.

N. Bjorner, A. Blass, and Y. Gurevich, "Content-dependent chunking for differential compression, the local maximum approach," Journal of Computer and System Sciences, vol. 76, No. 3, pp. 154-203, 2010.

F. Douglis and A. Iyengar, "Application-specific delta-encoding via resemblance detection," in Proc. USENIX Annu. Tech. Conf. Gen. Track, pp. 113126, Jun. 2003.

A. Broder, "Identifying and filtering near-duplicate documents," in Proc. Combinatorial Pattern Matching, pp. 110, Jun. 2000.

P. Kulkarni, F. Douglis, J.D. LaVoie, and J.M. Tracey, "redundancy elimination within large collections of files," Proc. USENIX Annu. Tech. Conf., pp. 59-72, Jun. 2004.

A. Z. Broder, On the resemblance and containment of documents, in Proc. Compress. Complexity Sequences, pp. 2129, Jun. 1997.

W. Xia, H. Jiang, D. Feng, and L. Tian, "Combining deduplicaiton and delta copression to achieve low-overhead data reduction on backup datasets," in Proc. IEEE Data Compression Conf. pp. 203212, Mar. 2014.

W. Xia, H. Jiang, D. Feng, and L. Tian, "DARE: A deduplicaiton-aware resemblance detection and elimination scheme for data reduction with low overheads," IEEE Trans. Computers, vol. 65, No. 6, pp. 1692-1705, 2016.

W. Xia, H. Jiang, D. Feng, F. Douglis, P. Shilane, Y. Hua, M. Fu, Y. Zhang, and Y. Zhou, "A comprehensive study of the past, present, and future of data deduplication," Proceedings of the IEEE, vol. 104, No. 9, pp. 1681-1710, Sep. 2016.

J. Ziv and A. Lempel, "A universal algorithm for sequential data compression," IEEE Trans. Inf. Theory, vol. 23, No. 3, pp. 337-343, 1977.

M Oberhumer, "LZO real-time data compression library," User manual for LZO version 0.28, Feb. 1997. Available: http://www.infosys.tuwien.ac.at/Staff/lux/marco/lzo.html.

L.P. Deutsch, "DEFLATE compressed data format specification version 1.3" RFC Editor, 1996. Available: http://tools.ietf.org/html/rfc1951.

J. Storer, et al, Data Compression via Textual Substituion, J. of Assoc. for Computing Machinery, vol. 19, No. 4, Oct. 1982, pp. 928-951.

Jarek Duda, et al., The Use of Asymmetric Numeral Systems as an Accurate Replacement for Huffman Coding, 978-1-4799-7783-3/15/$31.00, PCS 2015, pp. 65-69.

D.A. Huffman, A Method for the Construction of Minimum-Redundancy Codes*, Proc. of the I.R.E., pp. 1098-1101.

R.Hashemian, Life Member, IEEE, Condensed Huffman Coding, a New Efficient Decoding Technique, IEEE, 0-7803-7523-8, pp. I-228-I-231.

Reza Hashemian, Senior Member, IEEE, Direct Huffman Coding and Decoding Using the Table of Code-Lengths, Proc. of the International Conf. on Info. Tech.: Computers and Communications (ITCC'03), 0-7695-1916.

Harold Stone, A Logic-in-Memory Computer, IEEE Trans. on Computers, Jan. 1970, pp. 73-78.

K.R. Kaplan, et al., Cache-based Computer Systems, Computer, vol. 6, No. 3, pp. 30-36, 1973.

J. Ziv and A. Lempel, A Universal Algorithm for Sequential Data Compression, IEEE Trans. on Info. Theory, vol. 23, No. 3, pp. 337-343, May 1977.

Jacob Ziv, et al., Compression of Individual Sequences via Variable-Rate Coding, IEEE Trans. on Info. Theory, vol. IT-24, No. 5, Sep. 1978, pp. 530-536.

I. Witten, et al., Arithmetic Coding for Data Compression, Computing Practices, Communications of the ACM, vol. 30, No. 6, Jun. 1987, pp. 520-540.

Yingquan Wu, A Burst Encoding Method for Chunk-Based Data Deduplication Systems, May 22, 2018.

Brad Nisbet, et al., White Paper: Enterprise Storage: The Foundation for Application and Data Availability, Dec. 2010.

International Search Report and Written Opinion, Int'l App. No. PCT/US2019/30222, filed May 1, 2019.

* cited by examiner

CHUNK-BASED DATA DEDUPLICATION

BACKGROUND

Digital data storage systems can utilize various techniques to minimize the amount of storage that is required for storing data. Such storage minimization techniques not only save time in terms of faster data processing, but can reduce redundancy and minimize storage costs as well.

One such storage optimization technology is data deduplication. Data deduplication employs a scheme in which the same block of data (or single segment) is simultaneously referred to by multiple pointers in different sets of metadata. In this manner, the block of data that is common to all data sets is stored only once, and duplicate copies of repeating data are eliminated.

A chunk-level data deduplication system is one that segments an incoming data set or input data stream into multiple data chunks. The incoming data set might be backup files in a backup environment for example. As another example, the incoming data set might be database snapshots, virtual machine images or the like. Data deduplication not only reduces storage space by eliminating duplicate data but also minimizes the transmission of redundant data in network environments.

Each incoming data chunk can be identified by creating a cryptographically secure hash signature or fingerprint, e.g., SHA-1, SHA-2, for each such data chunk. An index of all of the fingerprints with each one pointing to the corresponding data chunk is also created. This index then provides the reference list for determining which data chunk has been previously stored.

In fixed-length block deduplication, the multiple data chunks are fixed in size, i.e., they are segmented into fixed blocks. The length of the blocks may be 4K-Byte, for example. As another example, the length may be 16K-Byte. In variable-length deduplication, the multiple data chunks are segmented into variable-sized block units. Here, the length of each variable-sized unit is dependent upon the content itself.

In common practice, an incoming data chunk and a preceding data chunk may vary by a single burst. In backup systems, for example, single files are backup images which are made up of large numbers of component files. These files are rarely entirely identical even when they are successive backups of the same file system. A single addition, deletion, or change of any component file can easily shift the remaining image content. Even if no other file has changed, the shift would cause each fixed sized segment to be different than it was last time, containing some bytes from one neighbor and giving up some bytes to its other neighbor.

Generally, existing data deduplication systems and methods can be computationally costly and inefficient and can often result in storage of redundant or duplicate data particularly within the context described above. It is within this context that a need arises to address one or more disadvantages of conventional systems and methods.

BRIEF SUMMARY

Various exemplary embodiments of a chunk-based data deduplication system and method can be found in the present disclosure. In one embodiment, a deduplication method partitions one of multiple incoming data chunks that are received for storage into at least a head portion and a tail portion. A head fingerprint that uniquely identifies the head portion is generated along with tail fingerprint that also uniquely identifies the tail portion of the incoming data chunk.

The deduplication method includes providing a head SHA (Secure Hash Algorithm) and a tail SHA table. For each data chunk, the head SHA table includes mappings of a head fingerprint to a full fingerprint. The tail SHA table includes mappings of a tail fingerprint to a full fingerprint for each data chunk. The deduplication method determines whether the head fingerprint of the incoming data chunk is in the head SHA table or whether the tail fingerprint of the incoming data chunk is in the tail SHA table.

If the head fingerprint is in the head SHA table or the tail fingerprint is in the tail SHA table, the deduplication method uses the head or tail fingerprint (of the incoming data chunk) to identify a predecessor data chunk that is stored. Here, the predecessor data chunk and the incoming data chunk are almost identical. However, the incoming data chunk includes a burst of data over and above the data in the predecessor data chunk. Thereafter, the burst of data is identified and written into an available PBA (physical block address).

In one aspect, if the head fingerprint and the tail fingerprint (of the incoming data chunk) are unlocatable within the head SHA table or tail SHA table, then the incoming data chunk is written to an available PBA for storage in lieu of identifying the predecessor data chunk and writing the burst of data to the available PBA above.

In another embodiment, a reference LBA (logical block address) table is provided with the reference LBA having an entry that maps a logical block address to a full fingerprint of the predecessor data chunk and to the PBA storing the burst of data.

In another aspect, the deduplication method creates a new entry in an LBA table with the new entry mapping a logical block address to the full fingerprint of the incoming data chunk. In another embodiment, an entry in a SHA table is created with the entry in the SHA table mapping the logical block address to the PBA in which the incoming data chunk is stored.

In another aspect, the deduplication method generates a full fingerprint for the incoming data chunk. Here, the full fingerprint uniquely identifies the entirety of the incoming data chunk. The deduplication method examines a SHA table that maps full fingerprints to PBAs to determine whether the full fingerprint of the incoming data chunk matches a predecessor data chunk that is stored. If there is a match, the deduplication method creates a new entry in an LBA table with the new entry mapping a logical block address to the full fingerprint of the incoming data chunk.

In another embodiment, the deduplication method that uses the head fingerprint or said tail fingerprint to identify a stored data chunk is by: identifying, in the head SHA table if the head fingerprint of the predecessor data chunk and that of the incoming data chunk are the same; providing a SHA table having an entry mapping the full fingerprint of the predecessor data chunk to a PBA in which the predecessor data chunk is stored; and using the full fingerprint of the predecessor data chunk to retrieve the predecessor data chunk from the PBA storage. In yet another aspect, the deduplication method using said head fingerprint or said tail fingerprint to identify a stored data chunk is by identifying in the tail SHA table the tail fingerprint of the predecessor data chunk as being the same as the tail fingerprint.

In another embodiment, the incoming data chunk and not the burst data is written into a PBA (physical block address) for storage but only if the head fingerprint of the incoming data chunk is not in the head SHA table and the tail fingerprint of the incoming data chunk is not in the tail SHA table. However, if the head fingerprint of the incoming data chunk is in the head SHA table or the tail fingerprint of the incoming data chunk is in the tail SHA table, the head fingerprint or said tail fingerprint is used to locate a predecessor data chunk that is stored. The predecessor data chunk and the incoming data chunk are almost a match except that the incoming data chunk includes a burst of data which is not included in the predecessor data chunk. The burst is then stored in a PBA (physical block address) in lieu of writing the incoming data chunk into storage.

A further understanding of the nature and advantages of the present disclosure herein may be realized by reference to the remaining portions of the specification and the attached drawings. Further features and advantages of the present disclosure, as well as the structure and operation of various embodiments of the present disclosure, are described in detail below with respect to the accompanying drawings. In the drawings, the same reference numbers indicate identical or functionally similar elements.

DETAILED DESCRIPTION OF THE DISCLOSURE

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

Figure 1:
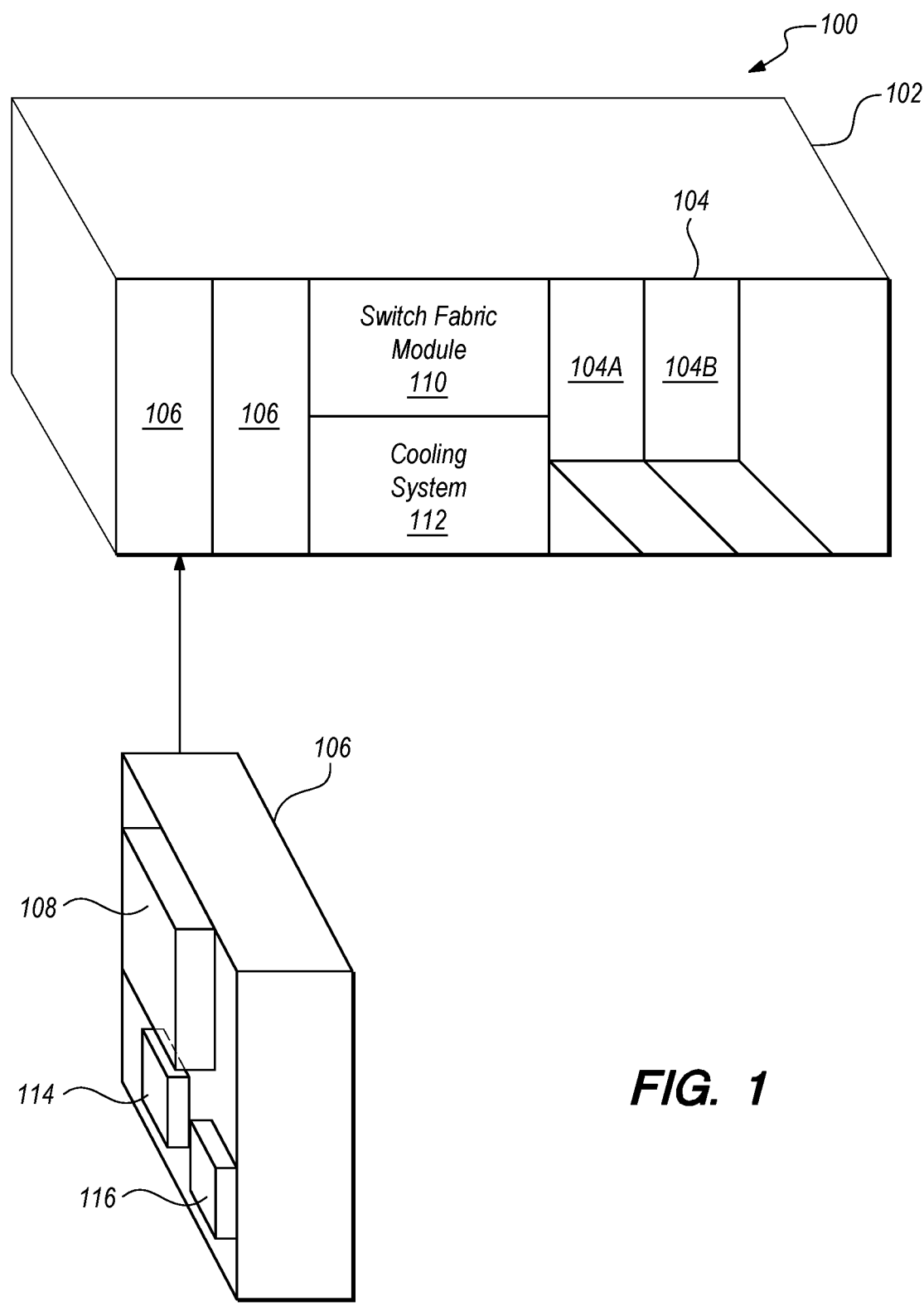
FIG. 1 illustrates an example storage cluster system usable with an exemplary embodiment of the present disclosure.

FIG. 1 illustrates an example storage cluster system 100 usable with an exemplary embodiment of the present disclosure.

In FIG. 1, storage cluster system 100 includes chassis 102 having a plurality of slots 104. Each slot 104 is sized to receive storage node 106 having internal nonvolatile solid-state memory 108 within each storage node 106. This storage arrangement might provide a localized storage or a storage area network according to embodiments of the present disclosure.

And thus, such a storage area network might include plural storage nodes 106 and multiple storage cluster systems 100 to provide a flexible configuration that is dependent on the storage memory requirements of a particular system. Depending on the number of slots 104 in a particular chassis, one or more storage cluster systems 100 appropriately communicably coupled might suffice. As an example, although only four slots 104 are shown here, chassis 102 might include sixteen such slots 104.

Those of ordinary skill in the art will realize that two sixteen-slot clusters may be coupled as necessary to meet storage memory requirements. Moreover, less than the number of slots 104 might also be employed. In FIG. 1, four slots 104 are shown. Two of the four slots are populated by storage nodes 106 while the other two slots 104A and 104B are empty.

In FIG. 1, chassis 102 of storage cluster system 100 further includes switch fabric module 110 and cooling system 112. Switch fabric module 110 interconnects storage nodes 106 via one or more network switches. By spreading data across multiple nodes, higher total throughput may be achieved. Although not shown, switch fabric module 110 might also include additional fabric modules to provide redundancy as well as a routing engine for routing data across a network. Cooling system 112 might include single or plural fan trays with each fan tray including two or more fans and where each fan tray is controlled by a fan tray controller.

One skilled in the art will realize that the storage node arrangements need not be in sequence but can be non-sequential. Note that storage nodes 106 can be hot-plugged. Therefore, each storage node 106 can be inserted into or removed from slot 104 without powering down the system or without significant interruption to the operation of the system. The system is automatically reconfigured when insertion or removal of storage node 106 is detected.

As shown in FIG. 1, storage node 106 includes internal solid-state memory 108 that might include a relatively fast nonvolatile solid-state memory such as nonvolatile random-access memory (NVRAM) and flash memory (not shown). Storage node 106 also includes processor 114 and memory 116. Here, instructions that may include one or more lines of code for execution by processor 114 can be stored in memory 116 in accordance with exemplary embodiments of the present disclosure.

Storage cluster system 100 of FIG. 1 might be utilized for primary storage for example. As another example, storage cluster system 100 may be a back-up system. In either case, the storage memory capacity is scalable and can be increased or reduced based on system requirements. For example, the storage cluster system 100 might be configured to have a storage capacity of 1 petabyte ($2^{50}$ bytes). As described with reference to the figures below, such a system can have increased deduplication ratios in accordance with embodiments of the present disclosure.

Chunk-Based Deduplication System

Traditional chunk-based deduplication systems exploit content-based addressing for deduplication. In such a system, each data file is first segmented into either a fixed or variable length chunk. Once segmented, the chunk is assigned a unique logical block address (LBA). A cryptographically secure hash algorithm (SHA) may be used as a unique fingerprint for each data chunk. Examples of SHA algorithms might include SHA-1, SHA-2, etc. Here, f (D) might be used to denote the fingerprint of a data chunk D. f (D) may be simply denoted by f for conciseness.

A chunk-based deduplication system might maintain two mapping tables, an LBA table and a SHA table map. The LBA table maps LBAs (denoted by l) to corresponding fingerprints (denoted f). This relationship is represented by [l: f]. A SHA table stores mappings from fingerprints f to physical block addresses (PBA) in the storage media along with reference counts. This relationship is represented by [f: p, c], where f is the fingerprint, p is the PBA and c is the reference count.

Deduplication Write
Inputs: [LBA: l, Data chunk: D]
1. Compute the fingerprint f=f (D).
2. Add a new entry, [l: f], to LBA table.
3. If f exists in the SHA table, then increase its reference count c by one.
4. Otherwise, compress D and write to an available PBA p, and create a new entry, [f: p, c=1], in the SHA table.

Deduplication Read
Input: LBA: l
1. Retrieve [l: f] from the LBA table.
2. Retrieve [f: p, c] from the SHA table.
3. Read (and decompress) data chunk D at the PBA p. Return D.

Deduplication Deletion
Input: LBA: l
1. Retrieve [l: f] from the LBA table.
2. Retrieve [f: p, c] from the SHA table, and set c←c−1.
3. If c=0 then mark both [f: p, c] and p for deletion.
4. Mark [l: f] for deletion.

In high-performance system storage, compression algorithms that may be employed include LZ77 and its variants such as LZO and optionally Huffman coding. Upon receiving an LBA read inquiry, the operating system retrieves fingerprint f from the LBA table, then the PBA p from the SHA table, reads out the (compressed) data chunk at the media PBA p and decompresses the data to the original form.

Upon receiving an LBA deletion request, first, the operating system looks up the fingerprint f from the LBA table, secondly reduces the corresponding reference count c by one over the SHA table, and lastly deletes the corresponding entry in the LBA table. Garbage collection is carried out periodically to clean up obsolete data chunks. Specifically, when a reference count c is zero, the corresponding data chunk is erased from the media and its SHA entry is deleted.

The following is a fixed length 4K deduplication example to illustrate the byte length of each parameter. Consider a storage system of 1 petabyte ($2^{50}$ bytes) capacity with an average deduplication ratio of 3 and an average compression ratio of 2. In general, the system can store $2^{50}/(4096/2)=2^{39}$ blocks of unique 4K byte data, and $3 \times 2^{39}$ blocks of raw 4K byte data. Consequently, LBA is represented in 6-byte while PBA suffices in 5-byte. SHA-1 fingerprint takes 20 bytes. Reference count c takes 1 byte (to avoid the rare chance of counter overflow wherein a popular block is referred in the more than 255 times and a second identical SHA entry is created with counter reset to 1).

Figure 2:
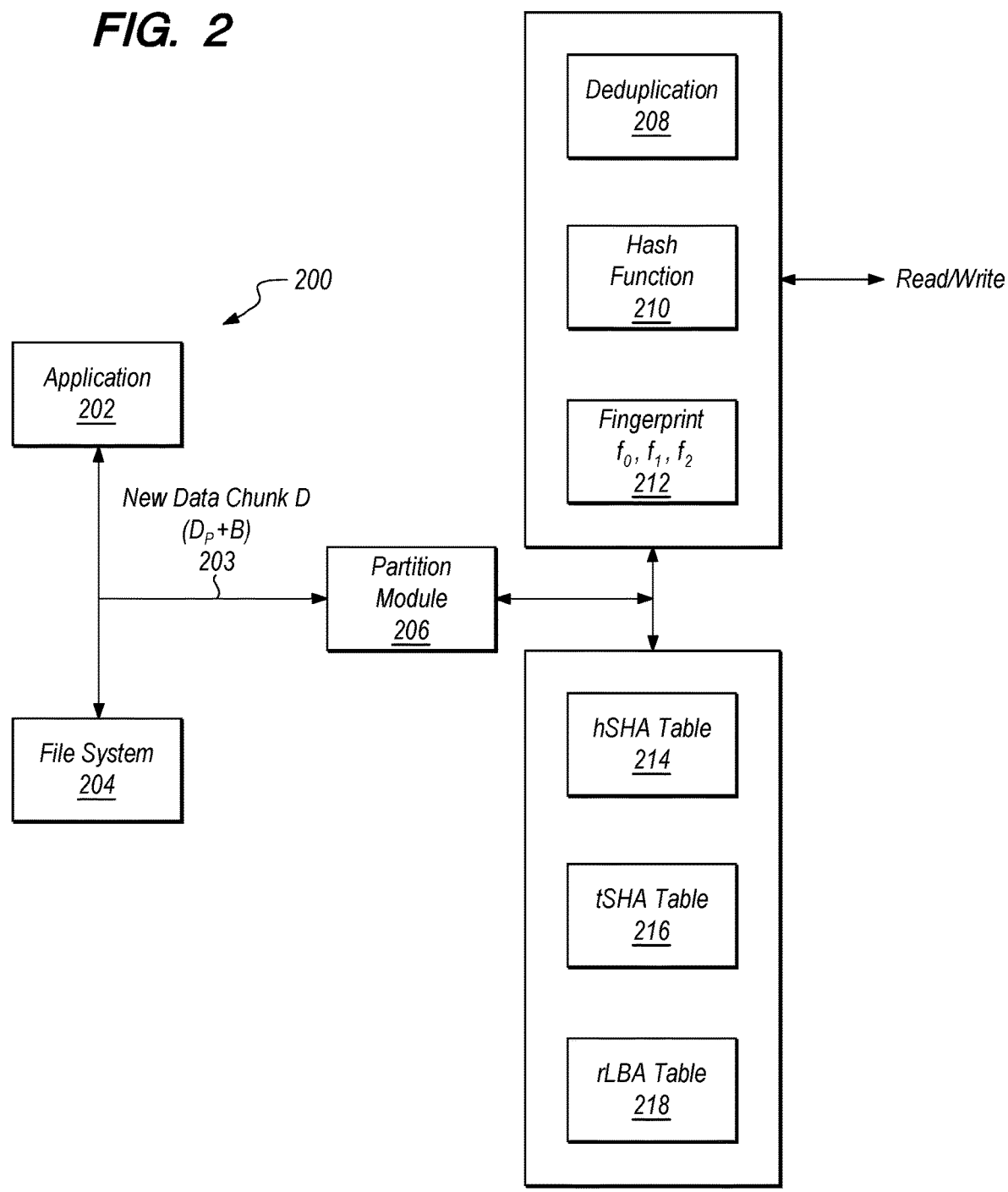
FIG. 2 illustrates a brief overview of a chunk-based data deduplication system according to an exemplary embodiment of the present disclosure.

In the example of FIG. 2, deduplication system 200 might include application 202 that directs a file system 204 to create one or more files (represented as new data chunk 203) for deduplication 208. In accordance with embodiments of the present disclosure, deduplication 208 reduces or eliminates redundant or duplicate data, and may do so inline during data creation and storage or during data back-up by storage cluster system 100 (FIG. 1).

In one example, deduplication 208 can occur inline as the data chunks are created or sent for storage in storage cluster system 100. Deduplication 208 may also occur post-process after the data is stored or backed up. Unlike traditional deduplication systems that have limited redundant data elimination capabilities, by recognizing and limiting the amount of redundant or duplicate data for storage, particularly when an incoming data chunk and a preceding data chunk vary by a single burst, the present disclosure facilitates quick access to data and improves storage memory capabilities such that computer technology is improved.

Here, after new data chunk D is created, it is sent to partition module 206 for partitioning. Note that as used here, new data chunk D consists of a preceding data chunk $D_P$ and a burst B, that is, $D=D_P+B$. Specifically, new data chunk D may vary from a preceding data chunk $D_P$ by a single burst of data B. This is because since creation of data is intentional, modifications of a file can be characterized as multiple bursts, rather than random bytes. Furthermore, a file is typically segmented into small chunks of average lengths of 4-8K bytes. Thus, chunk-wise modification can be assumed to be a single burst. Specifically, a burst B is defined by four elements:

B={start position, end position, burst length, burst data} where the end position data byte is not counted. A few examples are now provided to clarify the above definition. B={8, 10, 0, Ø} indicates that an incoming chunk deletes two bytes from reference chunk locations 8 and 9; B={8, 8, 1, a} indicates that an incoming chunk inserts a byte a at reference chunk location 8; B={8, 10, 3, abc} indicates that an incoming chunk replaces the two bytes of reference at positions 8 and 9 with three bytes abc (at the reference chunk location 8). An advantage of this burst encoding system and method is that it does not require the two similar chunks to be of equal length. One skilled in the art will understand that the degree of similarity might vary.

In the example of FIG. 2, partition module 206 receives new data chunk D 203 and partitions it into at least a head portion and a tail portion. Although not shown, multiple data chunks may be received by partition module 206. Upon receipt, each data chunk is similarly partitioned into at least a head portion and a tail portion. As discussed below, the head portion represents the outermost left portion of the data chunk while the tail portion represents the outermost right portion of the data chunk. For example, if new data chunk D 203 is 11011100, the head portion may be 110 while the tail portion might be 100.

After new data chunk 203 is partitioned, deduplication 208 uses hash function 210 to generate a fingerprint for the head portion. This head portion fingerprint uniquely identifies the head portion of the incoming data chunk. As with the head portion, deduplication 208 also uses hash function 210 to generate a fingerprint for the tail portion such that the tail portion fingerprint uniquely identifies new data chunk D 203. Moreover, a full fingerprint of the entirety of new data chunk 203 is also generated.

After the tail and head portion fingerprints are generated, deduplication 208 uses head SHA (secure hash algorithm) table 214 and tail SHA (secure hash algorithm) table 216 to determine whether the head fingerprint of new data chunk D 203 is in head SHA table 214 or whether the tail fingerprint of new data chunk D 203 is in tail SHA table 216. Head SHA table 214 includes mappings of the head portion fingerprint of a data chunk to the full fingerprint of the same data chunk. For example, for a preceding data chunk $D_P$ previously stored in storage cluster system 100, head SHA table 214 would include a head portion fingerprint of data chunk $D_P$ mapped to the full fingerprint of $D_P$ where the full fingerprint is a fingerprint of the entirety of the data chunk $D_P$.

Here, tail SHA table 216 includes mappings of the tail portion fingerprint of a data chunk to the full fingerprint of the same data chunk. For example, for a preceding data chunk $D_P$ previously stored in storage cluster system 100, tail SHA table 216 would include a tail portion fingerprint of data chunk $D_P$ mapped to the full fingerprint of $D_P$.

If the head fingerprint or tail fingerprint in the corresponding hSHA table 214 or tSHA table 216, deduplication 208 utilizes the head fingerprint or the tail fingerprint to identify a preceding data chunk $D_P$ that is stored. As previously noted, new data chunk 203 includes a data burst B over the data in preceding data chunk $D_P$. Otherwise, new data chunk 203 and preceding data chunk $D_P$ are the same. Deduplication 208 then determines what this burst B is and writes (or reads or deletes) into a PBA (physical block address). At this point, deduplication 208 then maps with the reference LBA (rLBA) table 218, a logical address to the fingerprint of the preceding data chunk $D_P$ and the physical block address in which the burst data B is stored.

A traditional and highly impractical way of determining whether new data chunk D 203 is similar to a previously stored data chunk $D_P$ is by exhaustive comparison with all existing data chunks. Such a system is time-consuming as the new data chunk must be compared to all of the stored preceding data chunks. Unlike conventional systems that create a single fingerprint for a data chunk, the present embodiment creates a head and a tail fingerprint for each data chunk that is written.

When a new (slightly modified by a data burst) data chunk arrives, either the head or the tail fingerprint of the new slightly modified data chunk is matched with that of a predecessor chunk. Thus, the predecessor chunk is identified and the difference (namely the data burst) between the new data chunk and the predecessor is stored rather than storing the entirety of the new data chunk. This is unlike conventional deduplication systems that cannot determine whether the two data chunks are almost identical or that one is a slightly modified version of the other, thus causing the storage of another almost identical data chunk.

One conventional approach to this type of variable-length segmenting approach is through computing a Rabin fingerprint for each sliding window of data bytes and to set chunk boundary when the associated Rabin fingerprint meets certain criteria, e.g., a number of least significant bits are all zeros. However, Rabin fingerprint segmenting is computationally costly because the number of computed fingerprints is as large as the data length. In fact, all existing variable-length segmenting methods compute certain metrics over a consecutive number of bytes associated with each byte.

Burst-Encoded Deduplication Write

Figure 3:
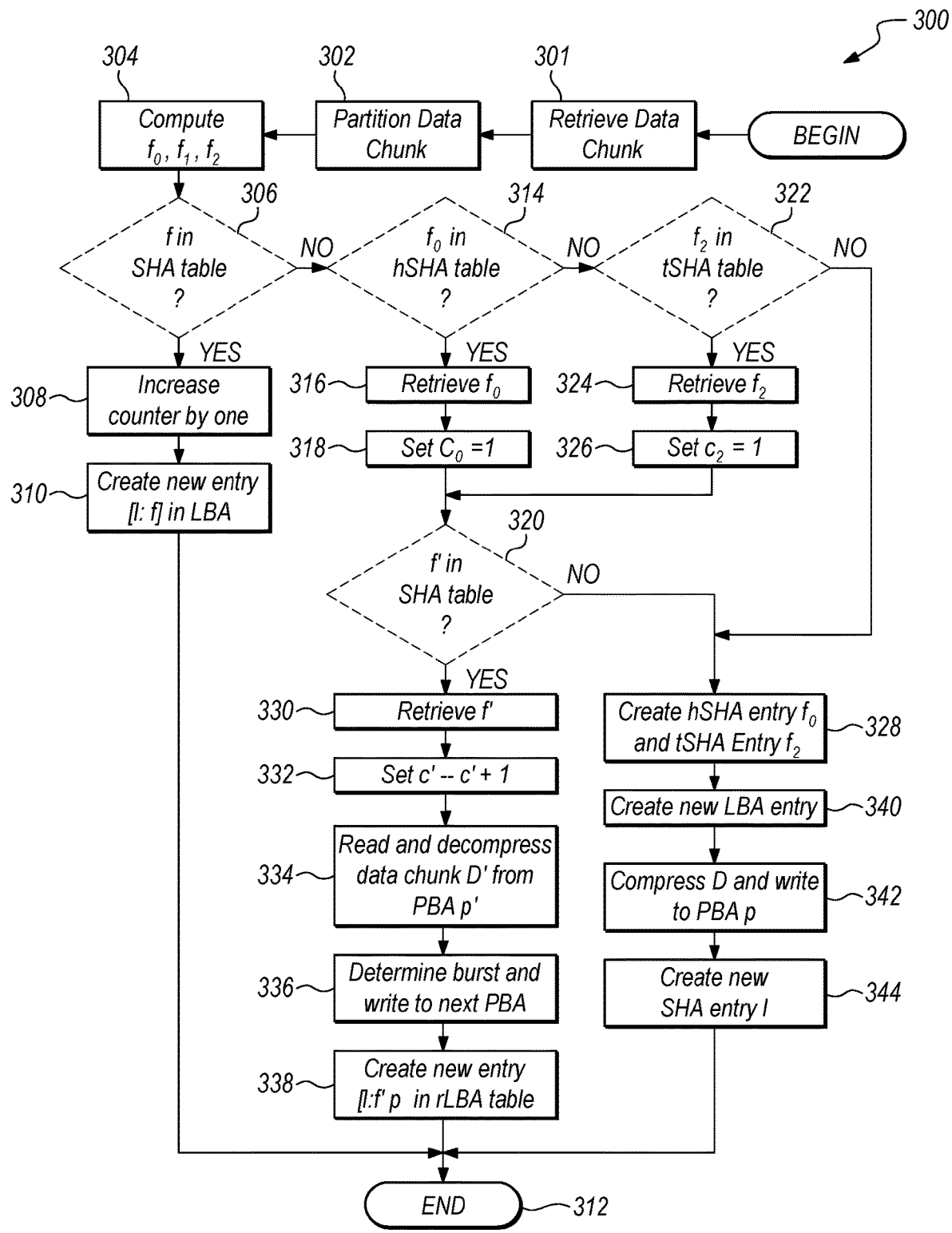
FIG. 3 illustrates a chunk-based data deduplication method according to an exemplary embodiment of the present disclosure.

FIG. 3 illustrates a chunk-based data deduplication method 300 according to an exemplary embodiment of the present disclosure.

In FIG. 3, at block 301, deduplication method 300 begins by receiving multiple data chunks for storage. The data chunks may be from an incoming data set or input data stream such as backup files in a backup environment.

At block 302, the incoming data chunk is portioned by partition module 206 (FIG. 2) according to one or more implementations. In one such implementation, as a first step, a new data chunk D of length l is received by partition module 206. At a second step, the new data chunk D is partitioned into at least three portions $[D_0, D_1, D_2]$. $D_0$ represents a head or leftmost portion of the data chunk D, $D_1$ represents a middle portion and $D_2$ is the tail or rightmost portion of the data chunk D. In this particular implementation, the partition is such that the lengths of $D_0$ and $D_2$ are equally $l_{min}/2$, where $l_{min}$ denotes a pre-defined minimum chunk length At block 304, fingerprint 212 (FIG. 2) cooperates with hash function 210 (FIG. 2) to generate finger prints for the new data chunk D, the tail portion $D_0$ and the head portion $D_2$ are computed. That is, fingerprints $f=f(D)$, $f_0=f(D_0)$, and $f_2=f(D_2)$ are determined.

At decision block 306, method 300 determines whether the fingerprint f of the data chunk exists in the SHA table.

At block 308, if f exists in the SHA table, then its counter is increased by one. As a consequence, at block 310, a new entry, [l: f] is created in the LBA table and the process terminates at end block 312.

Referring back to decision block 306, if f is not in the SHA table, chunk-based data deduplication method 300 proceeds to decision block 314. At this decision block 314, it is determined whether the head fingerprint $f_0$ is in head SHA table 214 and its corresponding counter $c_0=0$. Here, unlike conventional systems that employ only two tables, an embodiment of the present disclosure employs three extra tables: head SHA (hSHA) table 214, tail SHA (tSHA) table 216 and reference LBA (rLBA) table 218 (FIG. 2). Those skilled in the art will recognize that the legacy systems can severely limit data deduplication because the two tables (SHA and LBA) pertain only to full fingerprints of stored data chunks. Failure to recognize an incoming data chunk as an almost duplicate data chunk results in the entirety of the incoming data chunk being stored. This condition is illustrated in FIG. 4.

Figure 4:
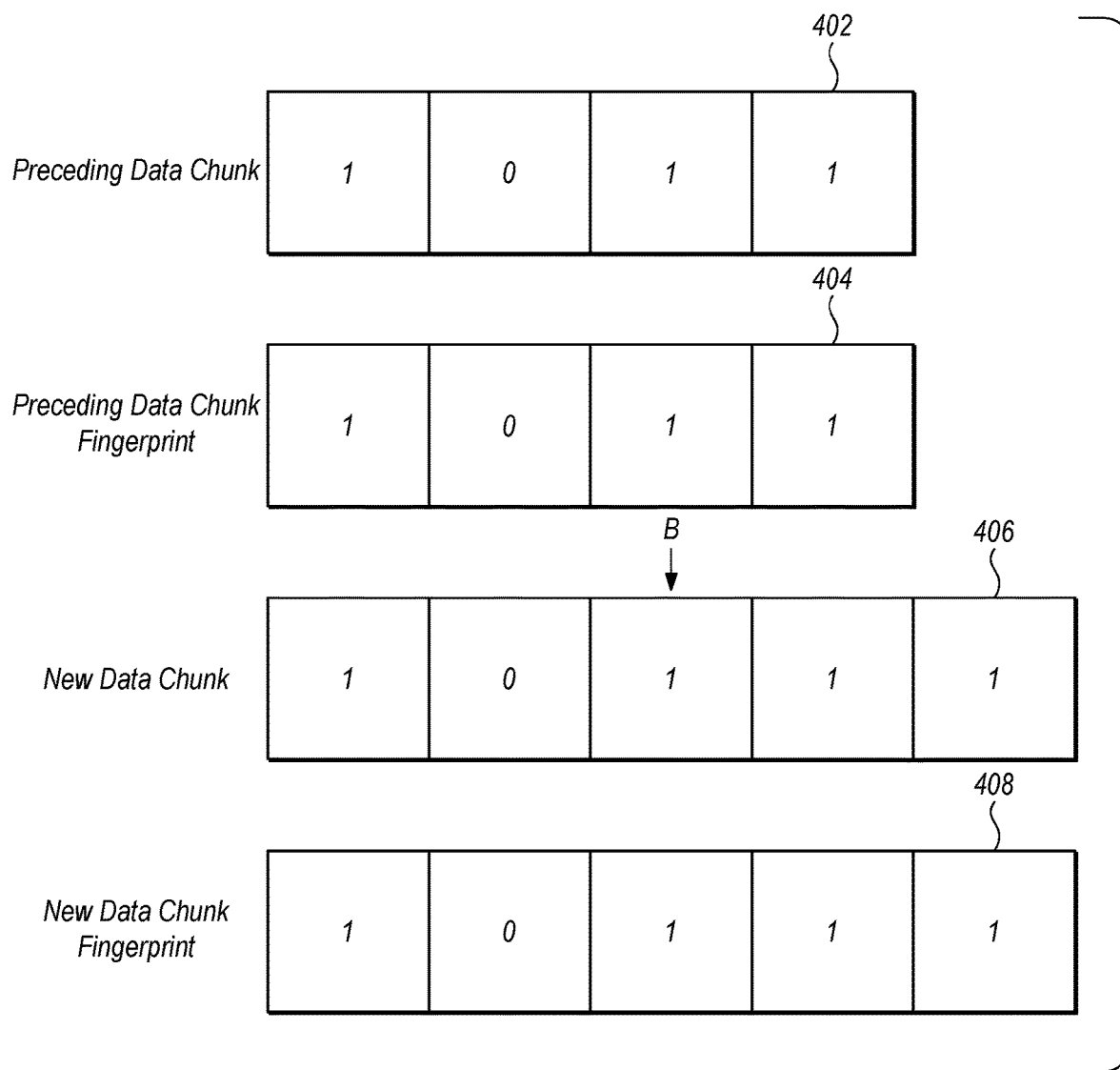
FIG. 4 illustrates a new data chunk with a data burst relative to a preceding data chunk.

In FIG. 4, preceding data chunk 402 that has previously been stored is shown. Finger print 404 of preceding data chunk 402 is also shown. When a single data burst B is added to preceding data chunk 402 as shown at 406, the entire fingerprint of preceding data chunk 402 is changed and now becomes new data chunk fingerprint 408. Thus, a search using new data chunk fingerprint 408 does not reveal preceding data chunk 402, causing the entire new data chunk 406 to be stored even though both new data chunk 406 and preceding data chunk 402 vary only by a single burst B Unlike legacy systems, embodiments of the present disclosure recognize that preceding data chunk 402 and new data chunk 406 are almost identical and differ merely by a single burst B. That single burst is then stored rather than storing the entirety of the new data chunk. Those skilled in the art will also recognize that use of three additional tables, the reference LBA (rLBA) table, the head SHA (hSHA) table and a tail SHA (tSHA) table overcomes the aforementioned disadvantages of legacy systems.

Here, the reference LBA (rLBA) table is in the form of [l: f', p˜], where the PBA p˜ contains the burst data B which reflects the difference of the LBA data D over the reference data D' which has fingerprint f'. The head SHA (hSHA) table is in the form $[f_0: f, c_0]$, where $f_0=f(D_0)$, $f=f(D)$, and $c_0$ denotes its reference count. The tail SHA (tSHA) table is in the form $[f_2: f, c_2]$, where $f_2=f(D_2)$, $f=f(D)$, and $c_2$ denotes its reference count.

In FIG. 3, referring back to decision block 314, if $f_0$ is in the head SHA table, then method 300 proceeds to block 316.

At block 316, method 300 retrieves the head fingerprint/preceding data chunk fingerprint entry $[f_0: f', c_0]$ from the hSHA table and at block 318 sets the counter $c_0=1$ after which method 300 proceeds to decision block 320.

Referring back to decision block 314, if the head fingerprint $f_0$ is not in the hSHA table, method 300 proceeds to decision block 322, where it is determined whether the tail fingerprint $f_2$ is in the tail SHA table. If so, method 300 proceeds to block 324.

At block 324, method 300 retrieves the tail fingerprint/preceding data chunk fingerprint entry $[f_2: f', c_0]$ from the tSHA table and at block 326 sets the counter $c_2=1$ after which method 300 returns to decision block 320.

At decision block 320, if f' is in the SHA table, then at block 330, the preceding data chunk fingerprint/physical block address entry [f': p', c'] is retrieved from the SHA table and at block 332, set c'←c'+1.

At block 334, method 300 reads (and decompresses) the preceding data chunk D' from PBA (physical block address) p'.

At block 336, method 300 determines the burst B between the new data chunk D 203 (FIG. 2) and the preceding data chunk D' and writes that burst B to the next available PBA p~.

At block 338, method 300 creates a new logical block address/preceding data fingerprint/burst physical block address entry, [l: f', p~], in the rLBA table.

Referring back to decision block 320, if the preceding data chunk fingerprint f' is not in the SHA table, processing proceeds to block 328. Similarly, at decision block 322, if the tail fingerprint $f_2$ is not in the tail SHA table, processing also proceeds to block 328.

At block 328, method 300 creates a head fingerprint/new data chunk full fingerprint hSHA entry, $[f_0: f, c_0=0]$, and a tail fingerprint/new data chunk full fingerprint tSHA entry, $[f_2: f, c_2=0]$.

At block 340, method 300 creates a logical block address/full fingerprint LBA entry, [l: f] for the new data chunk D 203 (FIG. 2).

At block 342, method 300 compresses the new data chunk D and writes to an available PBA p, and creates, at block 344, a new SHA entry, [l: p, c=1] for the new data chunk D.

In blocks 316 and 324 and associated blocks, when f⁻ is in the cSHA table and the corresponding c⁻=1, the incoming new data chunk D and an existing chunk D* are both referring to a prior chunk D'. It is highly likely that D=D* and more duplicates of D are on the way. To this end, it is more efficient to create a new fingerprint for D so that future duplicates of D can be directly deduplicated through the conventional LBA and SHA tables.

Note also that LBAs are partitioned into two tables, namely, LBA table and rLBA table. The possibility of nonexistent [f': p', c'] at decision block 320, b is due to an asynchronous deletion process. The counterpart read and deletion operations are self-described below. Although a burst encoded deduplication write algorithm has been described, other suitable burst encoded deduplication write algorithms may be employed.

Burst-Encoded Deduplication Read

One exemplary embodiment and algorithm for burst-encoded deduplication read is as follows. Input: LBA: l
1. If l lies in the LBA table, then
   (a) Retrieve l: f] from the LBA table.
   (b) Retrieve [f: p, c] from the SHA table.
   (c) Read (and decompresses) data chunk D at PBA p. Return D.
2. Else,
   (a) Retrieve [l: f', p~] from the rLBA table.
   (b) Read B from PBA p~.
   (c) Retrieve [f: p', c'] from the SHA table.
   (d) Read (and decompress) reference data chunk D' at the PBA p'.
   (e) Apply the burst B over D' to yield D. Return D.

Burst-Encoded Deduplication Deletion

One exemplary embodiment and algorithm for burst-encoded deduplication deletion is as follows Input: LBA: l
1. If l lies in the LBA table, then
   (a) Retrieve [l: f] from the LBA table.
   (b) Retrieve [f: p, c] from the SHA table, and set c←c−1.
   (c) If c=0 then mark both [f: p, c] and p for deletion.
   (d) Mark [l: f] for deletion.
2. Else,
   (a) Retrieve [l: f, p~] from the rLBA table.
   (b) Retrieve [f: p, c] from the SHA table, and set c←c−1.
   (c) Mark p~ for deletion.
   (d) Mark [l: f, p~] for deletion.

Although burst-encoded deduplication write, read and delete algorithms have been described, other suitable burst-encoded deduplication write, delete and read algorithms may be employed. Note that in the embodiment disclosed above, the above deletion process does not account for deleting obsolete hSHA or tSHA entries. Instead, the hSHA and tSHA tables may be periodically scanned to remove entries [fi: f, ci] (i=0, 2) such that f is nonexistent in the SHA table.

For this reason, due to asynchronous update on the deletion operation of SHA entry [f: p, c] from hSHA entry [f0: f, c0] and tSHA entry [f2: f, c2], Step 3.b may fail during the write process. In such a case, the reference write is regarded as invalid and a new write is subsequently performed. Another advantage of the present disclosure is that the burst-encoded deduplication scheme of the present disclosure is compatible with the legacy deduplication scheme. That is, any deduplication chunk in the legacy scheme is also deduplicated in the new scheme.

Figure 5:
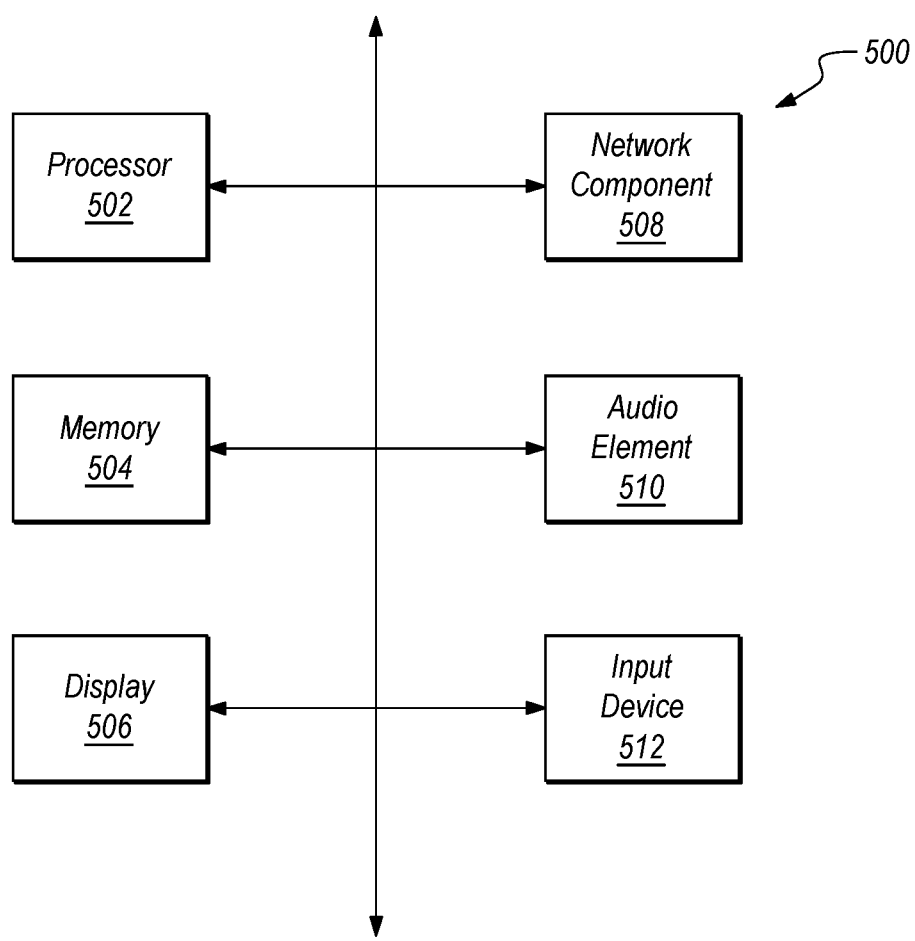
FIG. 5 illustrates one combination of a logical set of general components of an example computing device for burst encoding chunk-based data deduplication according to exemplary embodiments of the present disclosure.

FIG. 5 illustrates one combination of a logical set of general components for an example computing device 500 that may be utilized to implement burst encoding chunk-based data deduplication according to exemplary embodiments of the present disclosure. In this exemplary embodiment, the device comprises a processor 502 for executing instructions that can be stored in a memory device 504. The device might include various memory types, data storage, or non-transitory computer-readable storage media, such as a first data storage for program instructions for execution by processor 102, a separate storage for images or data, a removable memory for sharing information with other components, etc. The device may comprise display element 506, for example LCD (Liquid Crystal Display) or touch screen, although devices such as portable media players might convey information via other means, such as through audio speakers.

The device in many embodiments might include at least one input device 512 that receive input signals from a user. This input element might be a push button, touch pad, touch screen, wheel, joystick, keyboard, mouse, keypad or any other such device or element through which a user can interact or issue commands to the device. In some aspects, a device might exclude buttons and might be controlled only through visual and audio command, so that the user can control the device without contact with the input device. In other embodiments, the computing device can include one or more network interface elements 508 for communicating over various networks including Wi-Fi, Bluetooth, RF, wired, or wireless communication systems. The device in many embodiments can communicate with a network, such as the Internet, and may be able to communicate with other such devices. The example device can include one or more audio elements 510 as well, such as may include one or more speakers for generating audio output and/or one or more microphones for receive audio input, such as voice commands from a user.

Figure 6:
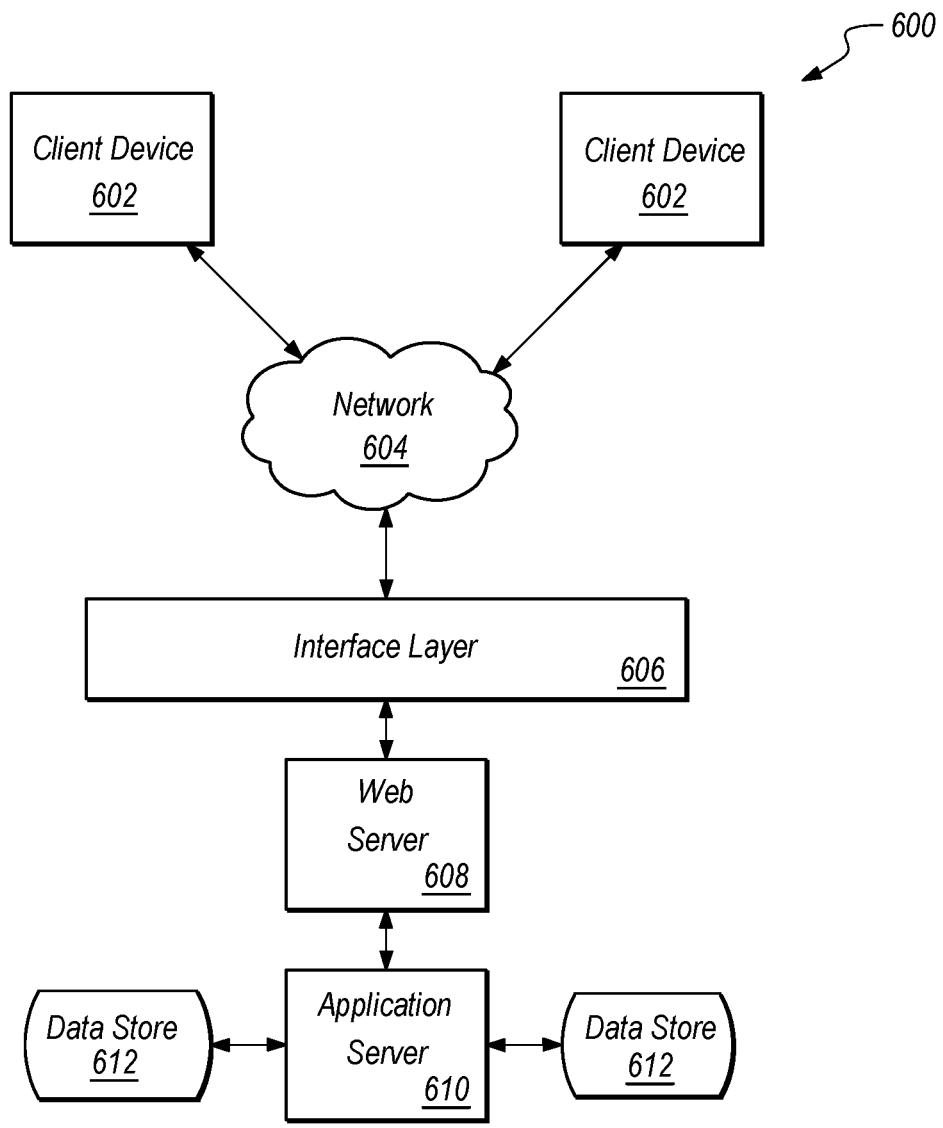
FIG. 6 illustrates one combination of a distributed system for burst encoding chunk-based data deduplication according to exemplary embodiments of the present disclosure.

FIG. 6 illustrates an example of an environment 600 in which various embodiments can be implemented. Example environments discussed herein for implementing aspects in accordance with various embodiments are primarily Web-based as relate to Web services and cloud computing, but it should be appreciated that, although a Web-based environment is used for purposes of explanation, different environments may be used as appropriate, to implement various embodiments. Client devices 602 employed with various embodiments can include any appropriate device operable to send and receive request, messages, or information over at least one appropriate network 604 and convey information back to a user of the device.

Examples of such client devices include personal computers, smart phones, hand held messaging devices, laptop computers, set-top boxes, personal data assistants, electronic book readers, and the like. The network can include any appropriate network, including an intranet, the Internet, a cellular network, a local area network, including an intranet, the Internet, a cellular network, a local area network, or any other such network or combination thereof. Components used for such a system can depend at least in part upon the types of network and/or environment selected. Communication over the network can be enabled by wired or wireless connections, and combination thereof. In at least some embodiments, a request from the client device can be received to an interface layer 606 associated with a destination address of the request, where the interface layer can include components such as routers, load balancers, application programming interfaces, and the like. The interface layer can receive the request and direct information for the request to one or more computing resources, such as one or more Web servers 608 and/or one or more application servers 610, which can process the request using data in one or more data stores or databases 612 in at least some embodiments. It should be understood that there can be several application servers, layers or other elements, processes, or components, which may be chained or otherwise configured, which can interact to perform tasks as discussed and suggested herein.

As used herein a data store refers to any device or combination of device capable of storing, accessing, and retrieving data, which may include any combination and number of data servers, databases, data storage device, and data storage media in any standard distributed or clustered environment. The data store may be specially programmed to implement embodiments of the present disclosure thus making such implementation non-generic. A server can include any appropriate hardware and software for integrating with the data store as needed to execute aspects of the one or more applications for the client device, handling a majority of the data access and business logic for an application. The application server provides access control services in cooperation with the data store, and is able to generate content such as text, graphics, audio, and/or video to be transferred to the user, which may be serviced to the user by the Web server in form of HTML, DHTML, XML or another appropriate structured language in the example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein. Each server typically will include an operating system that provides executable program instructions for the general administration and operation of that server, and includes a non-transitory computer readable medium storing instructions that, when executed by a processor of the server, allow the server to perform its intended functions.

Embodiments of the present disclosure may be specially programmed and implemented to make them non-generic. Embodiments may use ASICs (Application-Specific Integrated Circuits) and/or specially programmed using Programmable Logic Devices (PLDs), including Complex Programmable Logic Devices (CPLDs) and Field Programmable Gate Arrays (FPGAs). In one embodiment, the environment is a distributed computing environment using several computer systems and components that are interconnected via communication links, using one or more computer networks or direct connections. Thus, the depictions of various systems and service herein should be taken as being illustrative and not limiting.

While the above is a complete description of exemplary specific embodiments of the disclosure, additional embodiments are also possible. Thus, the above description should not be taken as limiting the scope of the disclosure, which is defined by the appended claims along with their full scope of equivalents.

I claim:

1. A deduplication method comprising: receiving a plurality of incoming data chunks for storage; partitioning one of said plurality of incoming data chunks into at least a head portion and a tail portion; generating a fingerprint for said head portion, said head fingerprint uniquely identifying the head portion of the incoming data chunk; generating a fingerprint for the tail portion, said tail fingerprint uniquely identifying the tail portion of said incoming data chunk; mapping in a head SHA (secure hash algorithm) table, a head fingerprint to a full fingerprint for each respective data chunk; mapping in a tail SHA (secure hash algorithm) table, a tail fingerprint to a full fingerprint for each respective data chunk; determining whether the head fingerprint of the incoming data chunk is in the head SHA table or whether the tail fingerprint of the incoming data chunk is in the tail SHA table, if so, perform the steps: a) using said head fingerprint or said tail fingerprint of the incoming data chunk to identify a predecessor data chunk that is stored wherein the predecessor data chunk and the incoming data chunk are almost identical except that the incoming data chunk includes a burst of data over and above the data in the predecessor data chunk; b) determining said burst of data between the incoming data chunk and the predecessor data chunk; and c) writing said burst of data into storage at a PBA (physical block address) p.

2. The method of claim 1 wherein if the head fingerprint of the incoming data chunk is not in the head SHA table and the tail fingerprint of the incoming data chunk is not in the tail SHA table, then writing the incoming data chunk to an available PBAp for storage without performing steps a), b), and c).

3. The method of claim 1 further comprising
providing a reference LBA (logical block address) table having an entry that maps a logical block address to a full fingerprint of the predecessor data chunk and to the PBA p˜ storing the burst of data.

4. The method of claim 2 further comprising
creating an entry in the head SHA table, the entry in the head SHA table mapping the head fingerprint and the full fingerprint of the incoming data chunk; and
creating an entry in the tail SHA table, the entry in the tail SHA table mapping the tail fingerprint and the full fingerprint of the incoming data chunk.

5. The method of claim 4 further comprising
creating a new entry in an LBA table, the new entry LBA entry mapping a logical block address to the full fingerprint of the incoming data chunk.

6. The method of claim 5 further comprising
creating an entry in a SHA table, the entry in the SHA table mapping the logical block address to the PBA p in which the incoming data chunk is stored.

7. The method of claim 1 further comprising
generating a full fingerprint for the incoming data chunk, said full fingerprint uniquely identifying the entirety of the incoming data chunk.

8. The method of claim 7 further comprising
examining a SHA table that maps full fingerprints to PBAs to determine whether the full fingerprint of the incoming data chunk matches a predecessor data chunk that is stored, if so, creating a new entry in an LBA table, the new entry in the LBA table mapping a logical block address to the full fingerprint of the incoming data chunk.

9. The method of claim 1 wherein using said head fingerprint or said tail fingerprint to identify a stored data chunk is by
identifying, in the head SHA table, the head fingerprint of the predecessor data chunk as being the same as the head fingerprint of the incoming data chunk;
providing a SHA table having an entry mapping the full fingerprint of the predecessor data chunk to a PBA in which the predecessor data chunk is stored; and
using said full fingerprint of the predecessor data chunk to retrieve the predecessor data chunk from said PBA storage.

10. The method of claim 1 wherein using said head fingerprint or said tail fingerprint to identify a stored data chunk is by
identifying, in the tail SHA table, the tail fingerprint of the predecessor data chunk as being the same as the tail fingerprint of the incoming data chunk;
providing a SHA table having an entry mapping the full fingerprint of the predecessor data chunk to a PBA that stores the predecessor data chunk; and
using said full fingerprint of the predecessor data chunk to retrieve the predecessor data chunk from said PBA storage location.

11. The method of claim 9 wherein if the full fingerprint of the predecessor data chunk is not in the SHA table,
creating a new entry in the head SHA table, the new entry mapping the head fingerprint to the full fingerprint of the incoming data chunk, creating a new entry in an LBA table, the new LBA entry mapping a logical block address to the full fingerprint of the incoming data chunk, storing the incoming data chunk in a PBA and creating a new entry in the SHA table, the new SHA table entry mapping the logical block address to the PBA.

12. The method of claim 10 wherein if the full fingerprint of the predecessor data chunk is not in the SHA table, then:
creating a new entry in the tail SHA table, the new entry mapping the tail fingerprint to the full fingerprint of the incoming data chunk, creating a new entry in an LBA table, the new LBA entry mapping a logical block address to the full fingerprint of the incoming data chunk, storing the incoming data chunk in a PBA and creating a new entry in the SHA table, the new SHA table entry mapping the logical block address to the PBA.

13. The method of claim 3 further comprising
reading the incoming data chunk from storage by reading the burst of data from the PBA $p^\sim$;
reading the predecessor data chunk from storage; and
applying the burst of data over the processor data chunk to yield the incoming data chunk.

14. The method of claim 3 further comprising
deleting the incoming data chunk by deleting the burst of data and deleting the entry in the reference LBA table that maps the logical block address to the full fingerprint of the predecessor data chunk and to the PBA $p^\sim$.

15. A deduplication method comprising:
receiving a plurality of incoming data chunks for storage;
partitioning one of said plurality of incoming data chunks into at least a head portion and a tail portion;
generating a fingerprint for said head portion, said head fingerprint uniquely identifying the head portion of the incoming data chunk;
generating a fingerprint for the tail portion, said tail fingerprint uniquely identifying the tail portion of said incoming data chunk;
generating a full fingerprint for the incoming data chunk, said full fingerprint for uniquely identifying the entirety of the incoming data chunk;
mapping, in a head SHA (secure hash algorithm) table, the head fingerprint to the full fingerprint of the incoming data chunk; and
mapping, in a tail SHA (secure hash algorithm) table, the tail fingerprint of the predecessor data chunk to the full fingerprint of incoming data chunk; and
writing said incoming data chunk into a PBA (physical block address) for storage but only if the head fingerprint of the incoming data chunk is not in the head SHA table and the tail fingerprint of the incoming data chunk is not in the tail SHA table.

16. The method of claim 15 wherein if the head fingerprint of the incoming data chunk is in the head SHA table or the tail fingerprint of the incoming data chunk is in the tail SHA table,
using said head fingerprint or said tail fingerprint of the incoming data chunk to locate a predecessor data chunk that is stored, wherein the predecessor data chunk and the incoming data chunk are almost a match except that the incoming data chunk includes a burst of data which is not included in the predecessor data chunk; and
storing said burst of data in a PBA (physical block address) $p^\sim$ storage in lieu of writing the incoming data chunk into storage.

17. The method of claim 16 further comprising providing a reference LBA (logical block address) table having an entry that maps a logical block address to a full fingerprint of the predecessor data chunk and to the PBA $p^\sim$ storing the burst of data.

18. The method of claim 16 further comprising
creating an entry in the head SHA table, the entry in the head SHA table mapping the head fingerprint to the full fingerprint of the incoming data chunk; and
creating an entry in the tail SHA table, the entry in the tail SHA table mapping the tail fingerprint to the full fingerprint of the incoming data chunk.

19. A non-transitory machine-readable storage media having instructions for performing a method which causes a computing device to: receive a plurality of incoming data chunks for storage; partition one of said plurality of incoming data chunks into at least a head portion and a tail portion; generate a fingerprint for said head portion, said head fingerprint uniquely identifying the head portion of the incoming data chunk; generate a fingerprint for the tail portion, said tail fingerprint uniquely identifying the tail portion of said incoming data chunk; provide a head SHA (secure hash algorithm) table that maps, for each data chunk, a head fingerprint to a full fingerprint of the respective data chunk; provide a tail SHA (secure hash algorithm) table that maps, for each data chunk, a tail fingerprint to a full fingerprint of the respective data chunk; determine whether the head fingerprint of the incoming data chunk is in the head SHA table or whether the tail fingerprint of the incoming data chunk is in the tail SHA table, if so, perform the steps: a) use said head fingerprint or said tail fingerprint of the incoming data chunk to identify a predecessor data chunk that is stored wherein the predecessor data chunk and the incoming data chunk are almost identical except that the incoming data chunk includes a burst of data over and above the data in the predecessor data chunk; b) determine said burst of data between the incoming data chunk and the predecessor data chunk; and c) write said burst of data into storage at a PBA (physical block address) p.

20. The non-transitory machine-readable storage media of claim 19 wherein if the head fingerprint of the incoming data chunk is not in the head SHA table and the tail fingerprint of the incoming data chunk is not in the tail SHA table, then write the incoming data chunk to an available PBAp for storage without performing steps a), b), and c).

21. The non-transitory machine-readable storage media of claim 19 of claim 1 further comprising a reference LBA (logical block address) table having an entry that maps a logical block address to a full fingerprint of the predecessor data chunk and to the PBA p˜ storing the burst of data.

22. The non-transitory machine-readable storage media of claim 20 wherein writing the incoming data chunk to an available PBA (physical block address) p for storage comprises causing the computing device to:
create an entry in the head SHA table, the entry in the head SHA table mapping the head fingerprint and the full fingerprint of the incoming data chunk; and
create an entry in the tail SHA table, the entry in the tail SHA table mapping the tail fingerprint and the full fingerprint of the incoming data chunk.

23. The non-transitory machine-readable storage media of claim 19 further comprising causing the computing device to:
generate a full fingerprint for the incoming data chunk, said full fingerprint for uniquely identifying the entirety of the incoming data chunk.

24. A computing device comprising: a memory containing machine-readable storage media having stored thereon instructions for performing a method; and a processor coupled to the memory, the processor configured to execute the instructions to cause the processor to: receive a plurality of incoming data chunks for storage; partition one of said plurality of incoming data chunks into at least a head portion and a tail portion; generate a fingerprint for said head portion, said head fingerprint uniquely identifying the head portion of the incoming data chunk; generate a fingerprint for the tail portion, said tail fingerprint uniquely identifying the tail portion of said incoming data chunk; provide a head SHA (secure hash algorithm) table that maps, for each data 183 chunk, a head fingerprint to a full fingerprint of the respective data chunk; 184 provide a tail SHA (secure hash algorithm) table that maps, for each data 185 chunk, a tail fingerprint to a full fingerprint of the respective data chunk; determine whether the head fingerprint of the incoming data chunk is in the head SHA table or whether the tail fingerprint of the incoming data chunk is in the tail SHA table, if so, perform the steps: a) use said head fingerprint or said tail fingerprint of the incoming data chunk to identify a predecessor data chunk that is stored wherein the predecessor data chunk and the incoming data chunk are almost identical except that the incoming data chunk includes a burst of data over and above the data in the predecessor data chunk; b) determine said burst of data between the incoming data chunk and the predecessor data chunk: and c) write said burst of data into storage at a PBA (Physical Block Address) p-.

25. The computing device of claim 24 wherein if the head fingerprint of the incoming data chunk is not in the head SHA table and the tail fingerprint of the incoming data chunk is not in the tail SHA table, then write the incoming data chunk to an available 201 PBAp for storage without performing steps a), b), and c).

* * * * *